(12) United States Patent
Yang et al.

(10) Patent No.: US 7,788,498 B2
(45) Date of Patent: Aug. 31, 2010

(54) TRIPLE-TAP PASSWORD ENTRY

(75) Inventors: Yu Yang, Beijing (CN); Hui Wan, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1048 days.

(21) Appl. No.: 11/187,090

(22) Filed: Jul. 22, 2005

(65) Prior Publication Data
US 2007/0033647 A1 Feb. 8, 2007

(51) Int. Cl.
H04K 1/00 (2006.01)
H04L 9/00 (2006.01)

(52) U.S. Cl. .................. 713/183; 726/18; 725/25; 725/53; 715/816

(58) Field of Classification Search ............... None
See application file for complete search history.

(56) References Cited

U.S. PATENT DOCUMENTS

| | | | |
|---|---|---|---|
| 5,550,968 A * | 8/1996 | Miller et al. ............... 715/741 |
| 6,073,171 A | 6/2000 | Gaughan et al. |
| 6,097,383 A | 8/2000 | Gaughan et al. |
| 6,348,932 B1 | 2/2002 | Nishikawa et al. |
| 6,367,080 B1 | 4/2002 | Enomoto et al. |
| 6,747,676 B2 * | 6/2004 | Botz et al. ................. 715/741 |
| 6,912,605 B1 * | 6/2005 | Wright ...................... 710/60 |
| 7,171,693 B2 * | 1/2007 | Tucker et al. ............... 726/26 |
| 7,228,556 B2 * | 6/2007 | Beach et al. ............... 725/53 |
| 7,249,260 B2 * | 7/2007 | Moffat et al. .............. 713/183 |
| 2003/0005463 A1 | 1/2003 | Macrae et al. |
| 2003/0014750 A1 * | 1/2003 | Kamen ...................... 725/25 |
| 2003/0014753 A1 * | 1/2003 | Beach et al. ............... 725/53 |
| 2003/0110267 A1 * | 6/2003 | Prentice et al. ............ 709/227 |
| 2003/0192056 A1 | 10/2003 | Yun |
| 2004/0177272 A1 * | 9/2004 | Walters ..................... 713/201 |
| 2005/0005295 A1 | 1/2005 | Hui-Ling |
| 2005/0028206 A1 | 2/2005 | Cameron et al. |
| 2007/0061754 A1 * | 3/2007 | Ardhanari et al. .......... 715/816 |

FOREIGN PATENT DOCUMENTS

| EP | 1517559 | 3/2005 |
|---|---|---|
| WO | WO9826584 | 6/1998 |
| WO | WO2004061637 | 6/2004 |

OTHER PUBLICATIONS

High Speed, Interactive, Internet TV Channel requiring a Low Bandwidth Reverse Channel; abstract describing article, Jun. 18, 2003.
Microsoft TV Press Release, Alcatel and Microsoft create an industry-leading solution for IP Television, Feb. 22, 2005, printed Jul. 21, 2005.
"High Speed, Interactive, Internet TV Channel Requiring a Low Bandwidth Reverse Channel". Published Jun. 18, 2003, 3 pages.

* cited by examiner

*Primary Examiner*—Nasser Moazzami
*Assistant Examiner*—Fikremariam Yalew
(74) *Attorney, Agent, or Firm*—Lee & Hayes, PLLC

(57) ABSTRACT

Triple-tap password entry is described. In an embodiment, a password is received as a sequence of characters that are each entered as one or more keypad inputs, such as with a television remote control. The keypad inputs for each of the characters are displayed as the sequence of characters are received, and a character of the password is obscured after the character has been received such that the characters are consecutively obscured to conceal the password. A character of the password can be obscured when a subsequent character is received, or when a time duration of the character display meets and/or exceeds a time limit.

10 Claims, 6 Drawing Sheets

TRIPLE-TAP PASSWORD ENTRY

BACKGROUND

For an IP-based television system, a television remote control may be the only input device by which a user can interact with the IPTV system. Television remote controls can be difficult to use as text input devices, particularly due to the limited set of input keys that are available on such devices. For example, other than the various configuration and television-specific input keys, a television remote control may only have a standard numeric or alphanumeric input keypad that includes the numbers zero through nine to input a channel selection.

Various applications that may be available via a user's television system content provider, or that are otherwise accessible via an IPTV system, typically require a user to enter a text-based password that is displayed on a user interface. As a password is entered by a user, asterisks are usually displayed on the user interface to mask the characters of the password for confidentiality, such as in a television room where several people may be able to view a password that a user enters to access an application.

A conventional alphanumeric input keypad on a television remote control includes the numbers zero through nine along with the alphabetic characters "A" to "Z". Although zero (0) through nine (9) is a total of ten input keys, an alphanumeric or numeric input keypad is commonly referred to as a "9-key" keypad. The letters on a "9-key" keypad are distributed along with the numbers two (2) through nine (9). For example, the number two (2) includes the letters "A", "B", and "C", the number three (3) includes the letters "D", "E", and "F", and so on with each consecutive number being associated with the next consecutive three letters. The letters "Q" and "Z" may not be included on some keypads, but if they are, the number seven (7) has four associated letters to include "Q" and the number nine (9) has four associated letters to include "Z".

Techniques are available to enter text with an alphanumeric "9-key" keypad, however they are difficult to enter text. When a user enters the text characters of a password, the user only sees an asterisk ("*")on the user interface display for each character of the password as it is entered. The techniques to enter text and/or letters with a "9-key" keypad include multi-tapping (also referred to as "triple-tap") and triple-tap-extended which are commonly used with cell phones to create text messages. As described above, the letters "A", "B", and "C" are associated with the number two (2) input key on the keypad for triple-tap text entry. Pressing the input key once enters an "A", twice enters a "B", three times enters a "C", and four times enters a "2". For triple-tap-extended, multiple characters are mapped to the number two (2) input key on a keypad, such as "A", "B", "C", "a", "b", "c", "2", and the "@" symbol. Multiple characters are similarly mapped to the additional numeric input keys zero (0) through nine (9) on an alphanumeric "9-key" keypad for triple-tap-extended text entry.

Spelling out even a short password can require multiple key entries. For example, to spell out "CAB" with triple-tap, a user would have to press the number two (2) input key a total of six times—three more inputs than would be necessary with a conventional keyboard. While entering a password that includes a long character sequence with a television remote control, a user can become confused by the multiple keypad entries for each character when only asterisks are displayed on the user interface.

SUMMARY

This summary is provided to introduce simplified concepts of triple-tap password entry which is further described below in the Detailed Description. This summary is not intended to identify essential features of the claimed subject matter, nor is it intended for use in determining the scope of the claimed subject matter.

In an embodiment of triple-tap password entry, a password is received as a sequence of characters that are each entered as one or more keypad inputs, such as with a television remote control. The keypad inputs for each of the characters are displayed as the sequence of characters are received, and a character of the password is obscured after the character has been received such that the characters are consecutively obscured to conceal the password. A character of the password can be obscured when a subsequent character is received, or when a time duration of the character display meets and/or exceeds a time limit.

In another embodiment of triple-tap password entry, a television-based device receives triple-tap inputs entered on a keypad of a television remote control device, and a user interface displays the triple-tap inputs until a character of a password is received. A security application then initiates that the character of the password be obscured such that characters of a sequence are consecutively obscured after they are received to conceal the password. A time duration from when a character of the password is received can be determined, and the character of the password can be obscured on the user interface when the time duration meets and/or exceeds a time limit. Alternatively, the character of the password can be obscured on the user interface when a second character of the password is received. The characters of a password can be obscured with asterisks or with random characters to conceal the password.

BRIEF DESCRIPTION OF THE DRAWINGS

The same numbers are used throughout the drawings to reference like features and components.

DETAILED DESCRIPTION

Triple-tap password entry is described in which embodiments provide that a user can enter a password for an IPTV system utilizing triple-tap or triple-tap-extended text entry on an alphanumeric keypad of a television remote control, cell phone, or other similar device having a conventional "9-key" numeric or alphanumeric input keypad. A user can input the characters (e.g., letters, numbers, symbols, and/or any combination thereof) of the password and a user interface displays each consecutive character for a time duration, or until a subsequent character of the password is entered. The sequence of characters is consecutively obscured after they are received to conceal the password from others that may be able to view the password, such as in a television room. The characters of the password can be concealed with asterisks and/or random characters. This enables a user to enter a password and, if sufficiently long or complex, minimize the risk that someone else will be able to view and remember the password as it is entered.

While aspects of the described systems and methods for triple-tap password entry can be implemented in any number of different computing systems, environments, television-based entertainment systems, and/or configurations, embodiments of triple-tap password entry are described in the context of the following exemplary system architectures.

Figure 1:
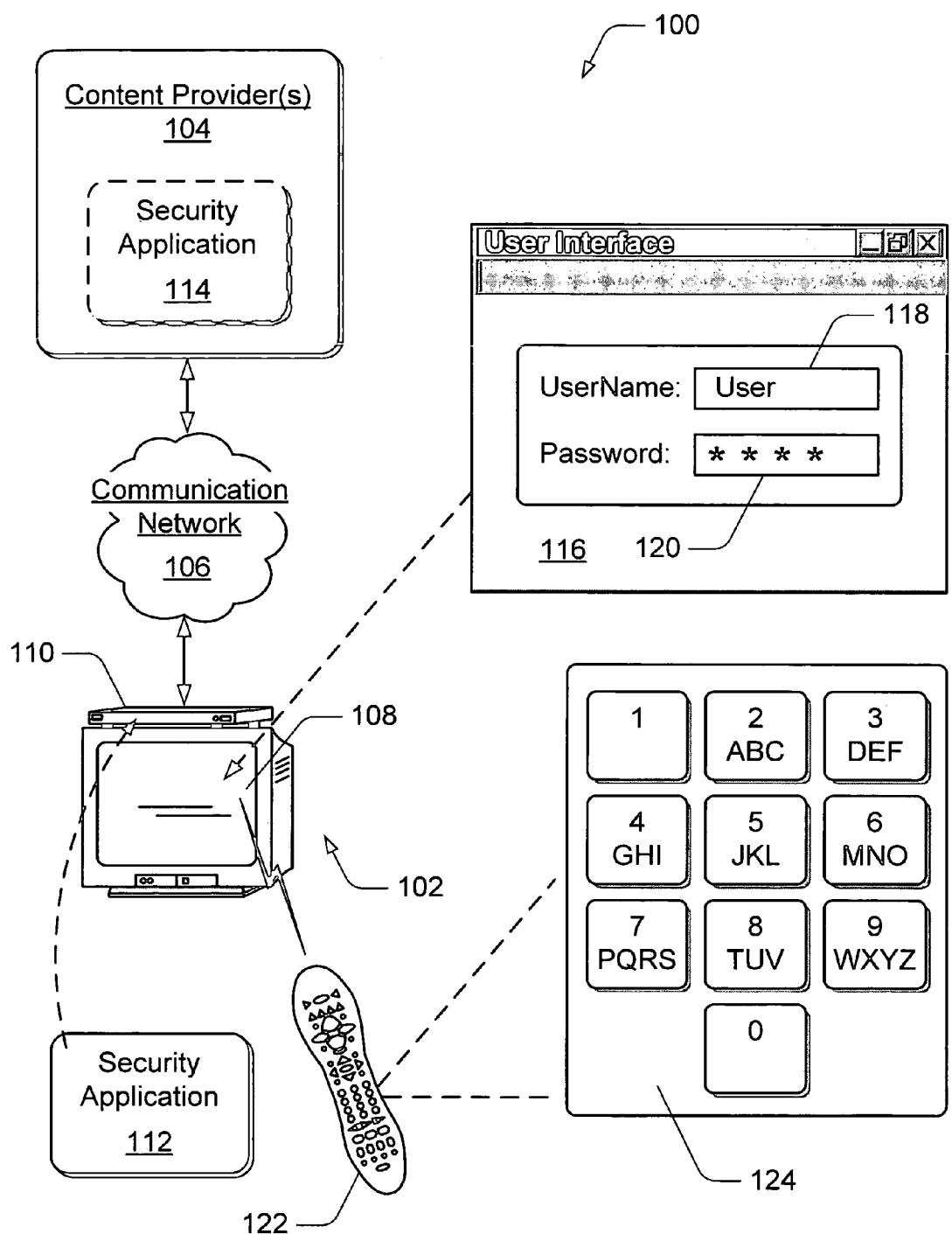
FIG. 1 illustrates an exemplary password entry system in which embodiments of triple-tap password entry can be implemented.

FIG. 1 illustrates an exemplary password entry system 100 in which embodiments of triple-tap password entry can be implemented. In this example, the system 100 includes an exemplary television-based client system 102 configured for data communication with any number of content provider(s) 104 via a communication network 106, which in this example, is an IP-based network. The client system 106 receives program content, various forms of media content, program guide data, advertising content, and the like from content server(s) of the content provider(s) 104 via the IP-based network 106.

The television-based client system 102 includes a display device 108 (e.g., a television, LCD display, or the like) and a client device 110. The client device 110 can be implemented in any number of embodiments, such as a set-top box, a digital video recorder (DVR) and playback system, a personal video recorder (PVR), an appliance device, a gaming system, any combination thereof, and as any other type of client device that may be implemented in a television-based entertainment and information system. In an embodiment, the client device 110 can be implemented with any one or combination of the components described with reference to client device 500 shown in FIG. 5. Further, any combination of the components described with reference to the password entry system 100 can be implemented in the exemplary television-based system 600 that includes examples of both a network-based content provider and television-based client devices as described with reference to FIG. 6.

A user at the television-based client system 102 can access any number of various applications and/or network-based applications that may be available via a content provider 104, or that are otherwise accessible via an IPTV system, such as the television-based system 600 described with reference to FIG. 6. In this example, the client device 110 includes a security application 112 that validates a username and password combination to allow a user access to the various applications via the client device 110. Alternatively, the security application described herein may be implemented as a component 114 of a content provider 104. Although the security application 112 is illustrated and described as a single application configured to implement embodiments of triple-tap password entry, the security application 112 can be implemented as several component applications (such as security applications 112 and 114) distributed to each perform one or more functions in a content provider 104 and/or client device 110.

A user interface 116 is displayed on the display device 108 to facilitate user logon and access to the various applications. In this example, the user interface 116 includes a username edit box 118 and a password edit box 120 that displays the sequence of characters input by a user for a password. The edit box 120 is illustrated as having asterisks displayed to obscure the characters of a password for confidentiality.

A user can input the sequence of characters for a password to access a network-based application with a television remote control 122 that has a "9-Key" alphanumeric keypad 124. A password can be entered as a sequence of characters that are each entered as one or more keypad inputs, such as triple-tap inputs or triple-tap-extended inputs. A password can be entered as any form of text, letters, a word, and/or any combination of alphabetic character(s) and numeric character (s). A user may also enter a password via the client device 110 with a cellular phone, PDA, or similar keypad input device which may be configured to operate as a television remote control device.

Figure 2:
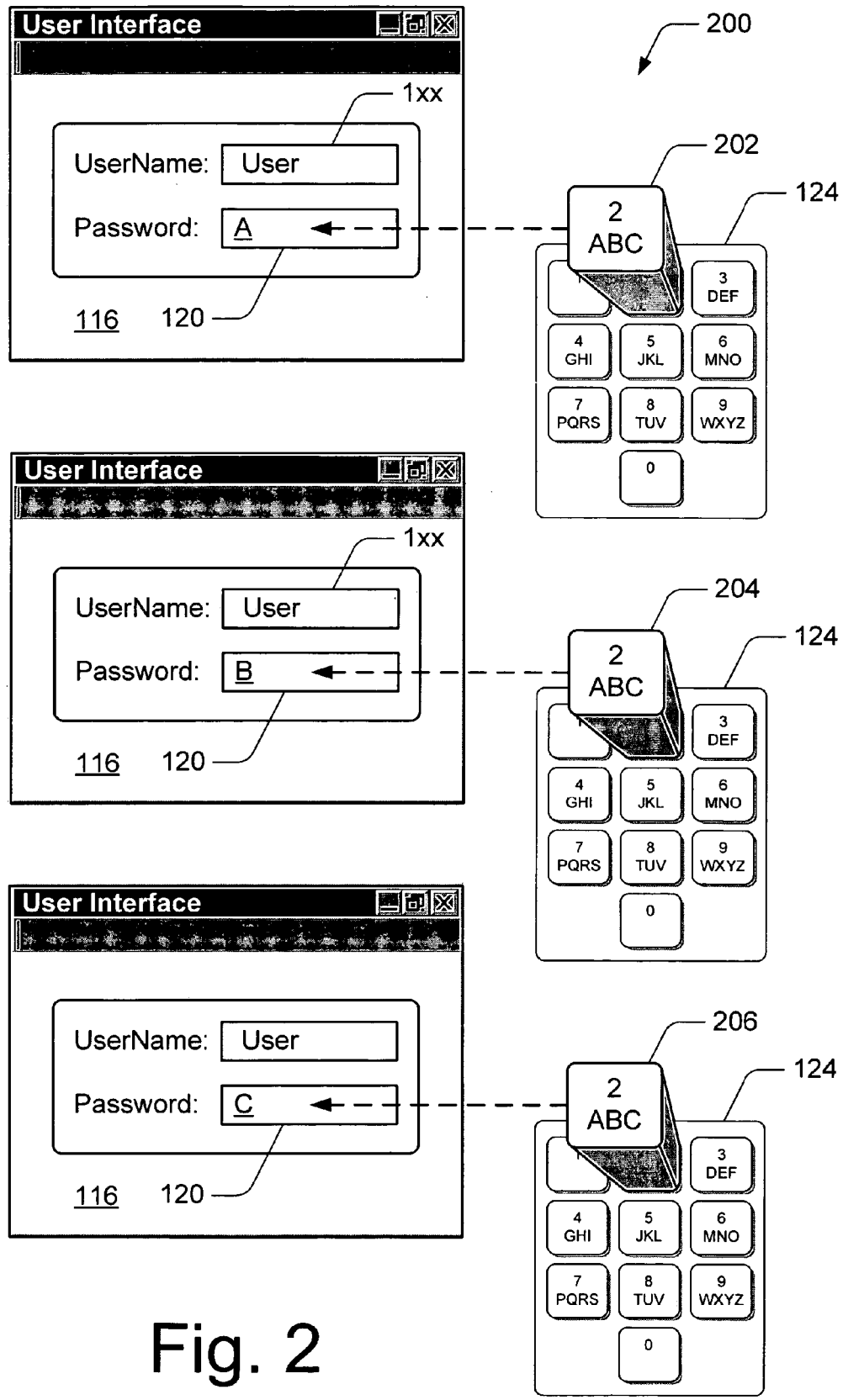
FIG. 2 illustrates an example entry of a password character entered with triple-tap keypad inputs in an embodiment of triple-tap password entry.

FIG. 2 illustrates an example entry 200 of a password character entered with triple-tap keypad inputs (to include triple-tap-extended keypad inputs as described herein). In this example, a user at the television-based client system 102 (FIG. 1) enters the character "C" as a first character in a sequence of characters that represent a password, "CDJ". When a user begins entering the password in the password edit box 120 shown on user interface 116, the user enters numeric input key "2" on the alphanumeric keypad 124 of the remote control device 122. For triple-tap text entry, pressing the input key "2" once enters an "A", twice enters a "B", three times enters a "C", and four times enters a "2".

When the user enters numeric key "2" a first time 202, an "A" is displayed in the password edit box 120. When the numeric key "2" is entered a second time 204, a "B" replaces the "A" and is displayed in the password edit box 120. When the numeric key "2" is entered a third time 206, the first character "C" of the password replaces the "B" and is displayed in the password edit box 120. The keypad inputs 202, 204, and 206 for the first character "C" of the password are displayed as "A", "B", and "C" respectively as the sequence of keypad inputs for the character is received at the television-based client device 110 as keypad inputs on remote control device 122.

Figure 3:
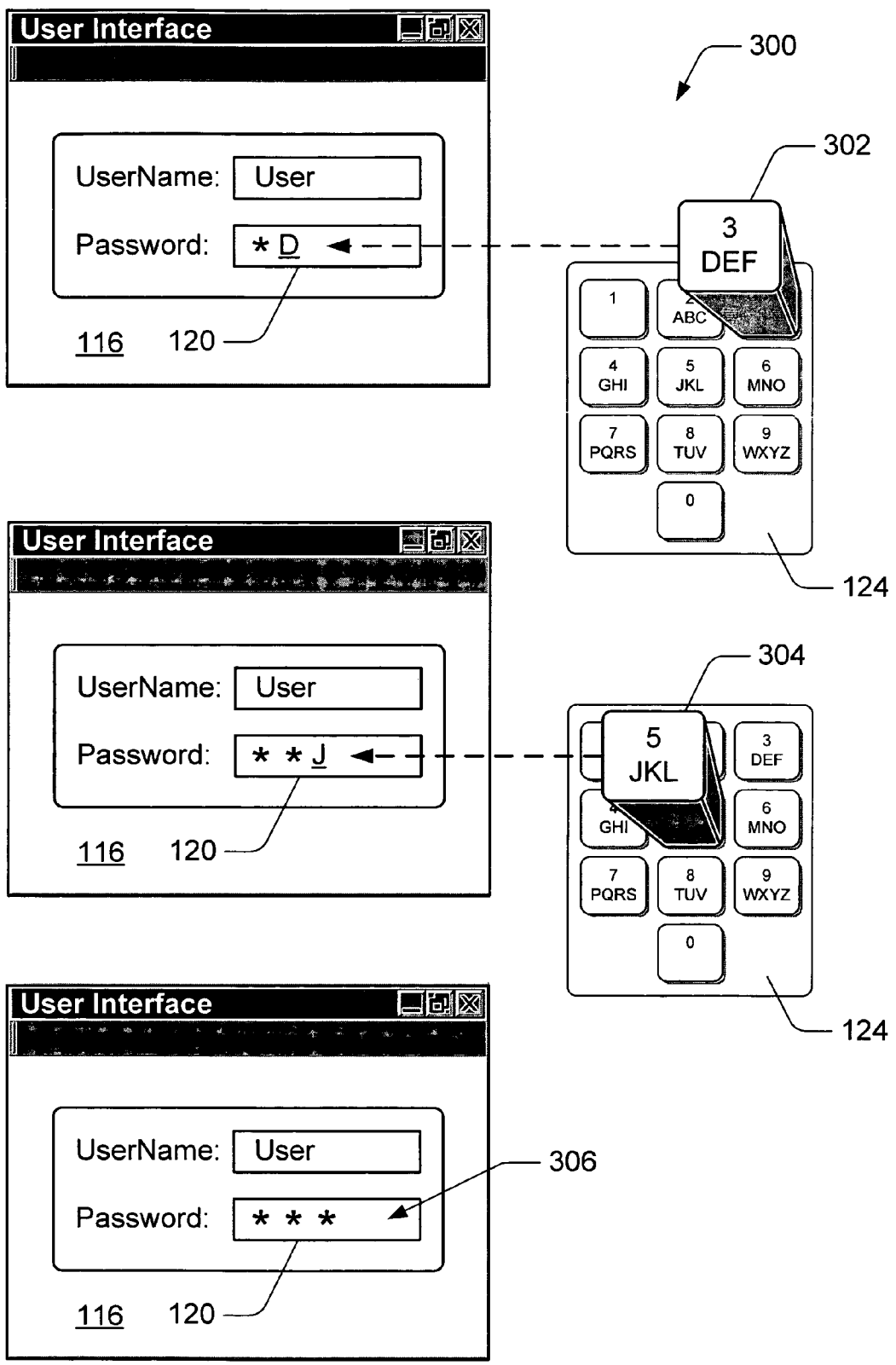
FIG. 3 further illustrates an example entry of password characters entered with triple-tap keypad inputs in an embodiment of triple-tap password entry.

FIG. 3 further illustrates an example entry 300 of password characters to continue entering the password "CDJ" with triple-tap keypad inputs. Continuing from the example entry 200 (FIG. 2), the user enters numeric input key "3" on the alphanumeric keypad 124 of the remote control device 122 to enter the second character "D" in the sequence of characters for the password. When the numeric key "3" is entered once at 302, the second character "D" is displayed in the password edit box 120 on the user interface 116. The first character "C" of the password is obscured with an asterisk ("*") to conceal the first character from being viewed on the display.

In an embodiment, the security application 112 (and/or security application 114 at content provider 104) obscures the first character "C" of the password with the asterisk when the second character input "D" is received at the client device 110. Alternatively, the security application 112 can determine a time duration beginning from when the first character "C" of the password is received, and initiate that the character of the password be obscured on the user interface 116 when the time duration meets and/or exceeds a time limit to display triple-tap keypad input(s). In an embodiment, the time limit may be approximately a two second delay during which the character of a password is displayed and then obscured with an asterisk.

The time duration may also be referred to as a time delay that represents how long a character of the password is displayed in the password edit box 120 on user interface 116 before being obscured. Although asterisks are shown in the examples described herein to obscure the sequence of characters to conceal a password, the characters can also be obscured with random characters, numbers, letters, symbols, and or any combination thereof to conceal a password from being displayed.

When the numeric input key "5" is entered once at 304 with the remote control device 122, the third character "J" in the sequence of characters for the password is displayed in the password edit box 120 on the user interface 116. Additionally, the second character "D" of the password is also obscured with an asterisk ("*") to conceal the first and second characters from being viewed on the display. The security application 112 obscures the second character "D" of the password with an asterisk when the third character input "J" is received at the client device 110. The security application 112 can also obscure the third character "J" with an asterisk at 306 when a time duration beginning from when the third character "J" is received meets and/or exceeds the time limit designated to display triple-tap keypad input(s) in the password edit box 120. As such, the characters of the password are each consecutively obscured after they are received to conceal the password.

Methods for triple-tap password entry, such as exemplary method 400 described with reference to FIG. 4, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
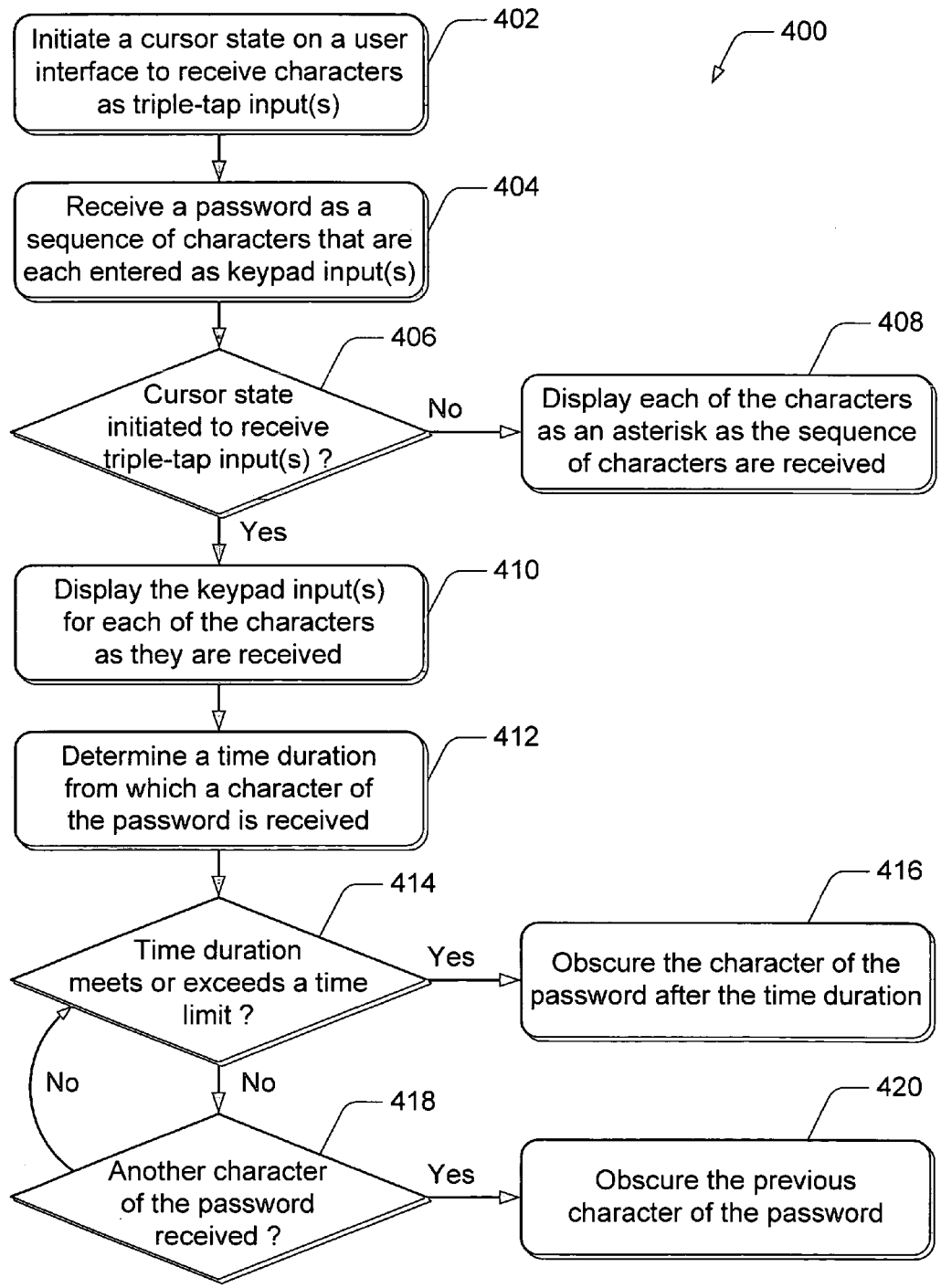
FIG. 4 illustrates an exemplary method for triple-tap password entry.

FIG. 4 illustrates an exemplary method 400 for triple-tap password entry, and is described with reference to generating search terms and numeric equivalents. The order in which the method is described is not intended to be construed as a limitation, and any number of the described method blocks can be combined in any order to implement the method. Furthermore, the method can be implemented in any suitable hardware, software, firmware, or combination thereof.

At block 402, a cursor state on a user interface is initiated to receive each of a sequence of characters as one or more triple-tap inputs (to include triple-tap-extended inputs as described herein). For example, the password edit box 120 on user interface 116 (FIG. 1) can be implemented to have a selectable cursor state that, when initiated, provides for triple-tap and triple-tap-extended inputs. At block 404, a password is received as a sequence of characters that are each entered as one or more keypad inputs. For example, a password can be received as a sequence of characters entered on an alphanumeric "9-key" keypad 124 with triple-tap or triple-tap-extended text entries. The keypad 124 can be a keypad of a television remote control device 122, a cell phone, a PDA, or other similar electronic device that may be implemented as a television-based input device.

At block 406, a determination is made as to whether the cursor state is initiated to receive the keypad input(s) as triple-tap inputs (e.g., if block 402 is included in an embodiment of triple-tap password entry). If the cursor state of the password edit box 120 on user interface 116 is not initiated to receive triple-tap input(s) (i.e., no from block 406), then each of the characters of a password are displayed as an asterisk as the sequence of characters are received at block 408. If the cursor state of the password edit box 120 on user interface 116 is initiated to receive triple-tap input(s) (i.e., yes from block 406), then the one or more keypad inputs for each of the characters of the password are displayed as the sequence of characters are received at block 410. For example, the triple-tap keypad inputs to enter the characters for the password "CDJ" are displayed in the password edit box 120 on user interface 116 until the character of the password is received so that a user can view the character that is being entered (FIGS. 2-3).

At block 412, a time duration from which a character of the password is received is determined. For example, a security component or application of the television-based client device 110 can determine a time duration beginning from when a character of a password is received, and initiate that the character of the password be obscured on the user interface 116 when the time duration meets or exceeds a time limit to display triple-tap keypad input(s). At block 414, a determination is made as to whether the time duration meets and/or exceeds a time limit to display a character of the password.

If the time duration meets or exceeds the time limit (i.e., yes from block 414), then the character of the password is obscured after the time duration or time delay at block 416. The method 400 can then return to block 404 to receive another character in the sequence of characters as the password is entered by a user as keypad input(s). If the time duration does not meet or exceed the time limit (i.e., no from block 414), then a determination is made as to whether another character of the password is received at block 418.

If another character of the password has not been received (i.e., no from block 418), then the method continues at block 414 to determine whether the time duration meets and/or exceeds the time limit to display a character of the password. If another character of the password has been received (i.e., yes from block 418), then the previous character of the password is obscured at block 420 such that the characters are each consecutively obscured to conceal the password. In various embodiments of triple-tap password entry, each character of a password can be obscured with an asterisk, or each character of the password can be obscured with a random character, to include letters, numbers, and symbols.

Figure 5:
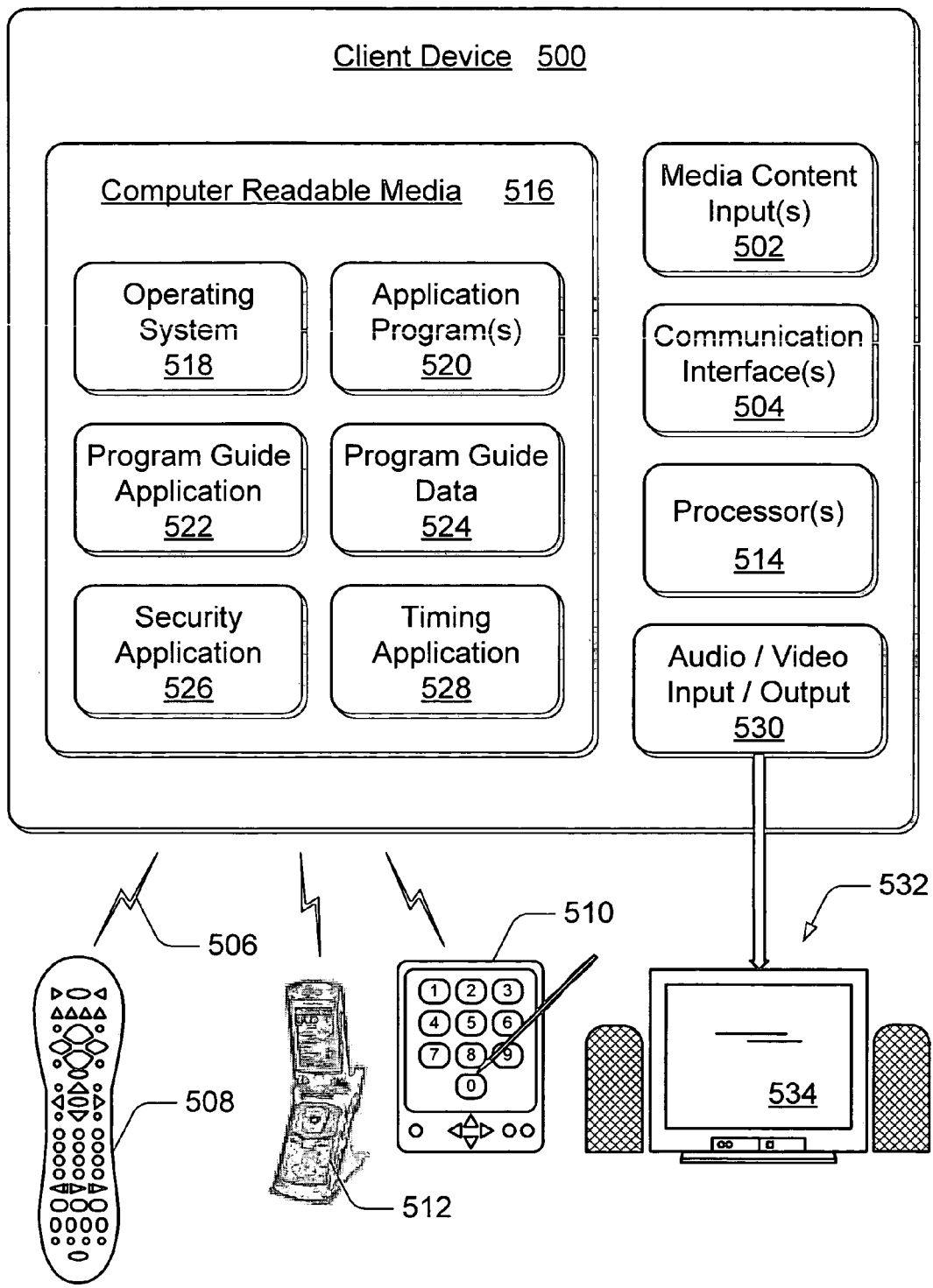
FIG. 5 illustrates various components of an exemplary client device in which embodiments of triple-tap password entry can be implemented.

FIG. 5 illustrates various components of an exemplary client device 500 which can be implemented as any form of a computing and/or electronic device, and in which embodiments of triple-tap password entry can be implemented. For example, the client device 500 can be implemented as the television-based client device 110 described with reference to FIGS. 1-3 and shown in FIG. 1.

Client device 500 includes one or more media content inputs 502 which may include Internet Protocol (IP) inputs over which streams of media content are received via an IP-based network. Device 500 further includes communication interface(s) 504 which can be implemented as any one or more of a serial and/or parallel interface, a wireless interface, any type of network interface, a modem, and as any other type of communication interface. A wireless interface enables client device 500 to receive control input commands 506 and other information from an input device, such as from remote control device 508, PDA (personal digital assistant) 510, cellular phone 512, or from another infrared (IR), 802.11, Bluetooth, or similar RF input device.

A network interface provides a connection between the client device 500 and a communication network by which other electronic and computing devices can communicate data with device 500. Similarly, a serial and/or parallel interface provides for data communication directly between client device 500 and the other electronic or computing devices. A modem facilitates client device 500 communication with other electronic and computing devices via a conventional telephone line, a DSL connection, cable, and/or other type of connection.

Client device 500 also includes one or more processors 514 (e.g., any of microprocessors, controllers, and the like) which process various computer executable instructions to control the operation of device 500, to communicate with other electronic and computing devices, and to implement embodiments of triple-tap password entry. Client device 500 can be implemented with computer readable media 516, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 516 provides data storage mechanisms to store various information and/or data such as software applications and any other types of information and data related to operational aspects of client device 500. For example, an operating system 518 and/or other application programs 520 can be maintained as software applications with the computer readable media 516 and executed on processor(s) 514 to implement embodiments of triple-tap password entry.

For example, client device 500 can be implemented to include a program guide application 522 that is implemented to process program guide data 524 and generate program guides for display which enable a viewer to navigate through an onscreen display and locate broadcast programs, recorded programs, video on-demand programs and movies, interactive game selections, network-based applications, and other media access information or content of interest to the viewer. The computer readable media 516 can also include a security application 526 and a timer application 528 to implement embodiments of triple-tap password entry, as described herein.

Although the security application 526 is illustrated and described as a single application configured to implement embodiments of triple-tap password entry, the security application 526 can be implemented as several component applications distributed to each perform one or more functions in a content provider (e.g., a server) and/or a client device in a television-based entertainment and information system. Further, the security application 526 may include the timer application 528 as an integrated module or component.

The client device 500 also includes an audio and/or video output 530 that provides audio and video to an audio rendering and/or display system 532, or to other devices that process, display, and/or otherwise render audio, video, and display data. Video signals and audio signals can be communicated from device 500 to a television 534 (or to other types of display devices) via an RF (radio frequency) link, S-video link, composite video link, component video link, analog audio connection, or other similar communication link.

Figure 6:
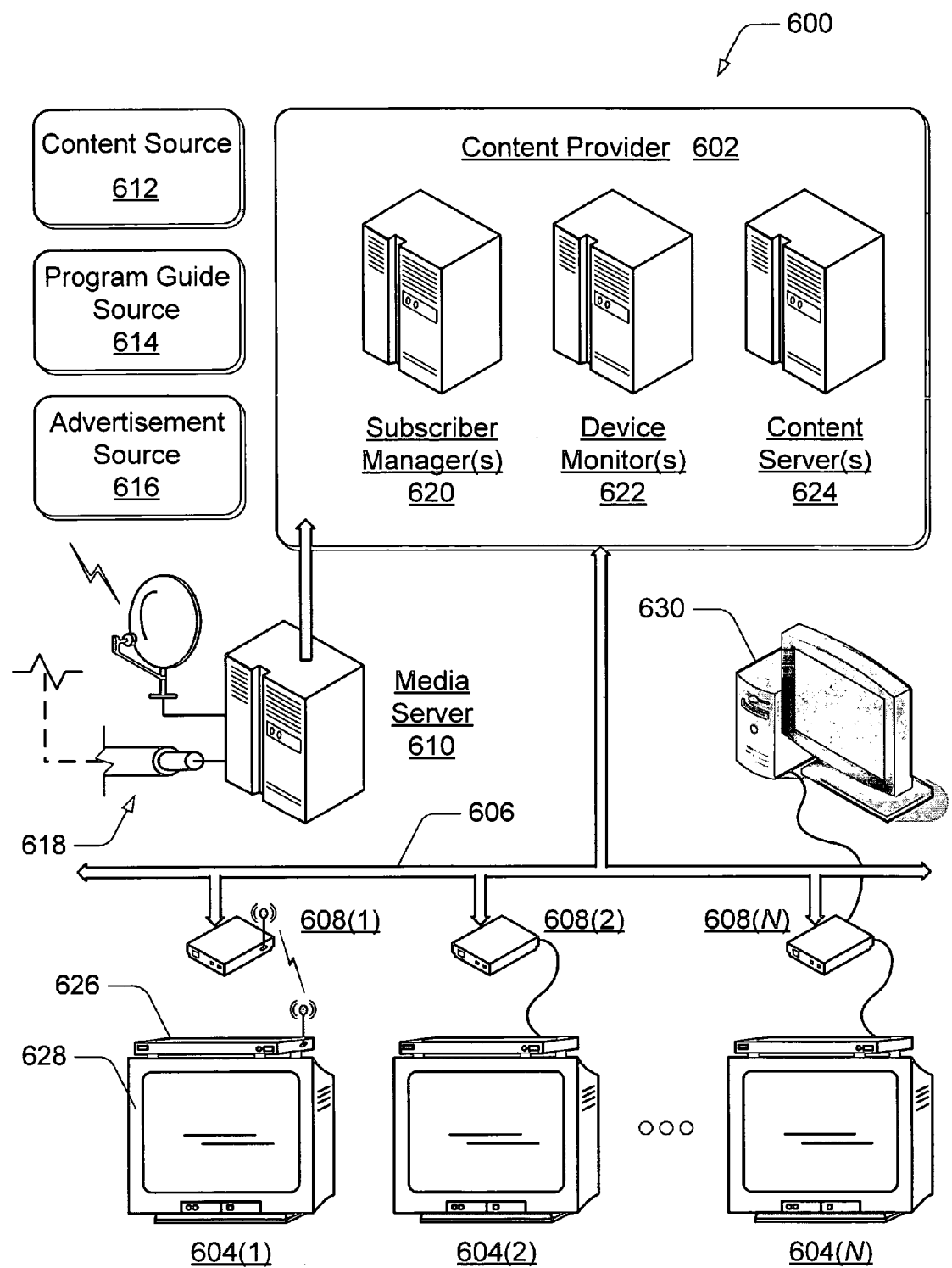
FIG. 6 illustrates various devices and components in an exemplary entertainment and information system in which embodiments of triple-tap password entry can be implemented.

FIG. 6 illustrates an exemplary entertainment and information system 600 in which an IP-based television environment can be implemented, and in which embodiments of triple-tap password entry can be implemented. System 600 facilitates the distribution of program content, program guide data, and advertising content to multiple viewers. System 600 includes a content provider 602 and television-based client systems 604(1-N) each configured for communication via an IP-based network 606.

The network 606 can be implemented as a wide area network (e.g., the Internet), an intranet, a Digital Subscriber Line (DSL) network infrastructure, or as a point-to-point coupling infrastructure. Additionally, network 606 can be implemented using any type of network topology and any network communication protocol, and can be represented or otherwise implemented as a combination of two or more networks. A digital network can include various hardwired and/or wireless links 608(1-N), routers, gateways, and so on to facilitate communication between content provider 602 and the client systems 604(1-N). The television-based client systems 604(1-N) receive program content, program guide data, advertising content, closed captions data, and the like from content server(s) of the content provider 602 via the IP-based network 606.

System 600 includes a media server 610 that receives program content from a content source 612, program guide data from a program guide source 614, and advertising content from an advertisement source 616. In an embodiment, the media server 610 represents an acquisition server that receives the audio and video program content from content source 612, an EPG server that receives the program guide data from program guide source 614, and/or an advertising management server that receives the advertising content from the advertisement source 616.

The content source 612, the program guide source 614, and the advertisement source 616 control distribution of the program content, the program guide data, and the advertising content to the media server 610 and/or to other television-based servers. The program content, program guide data, and advertising content is distributed via various transmission media 618, such as satellite transmission, radio frequency transmission, cable transmission, and/or via any number of other wired or wireless transmission media. In this example, media server 610 is shown as an independent component of system 600 that communicates the program content, program guide data, and advertising content to content provider 602. In an alternate implementation, media server 610 can be implemented as a component of content provider 602.

Content provider 602 is representative of a headend service in a television-based content distribution system, for example, that provides the program content, program guide data, and advertising content to multiple subscribers (e.g., the television-based client systems 604(1-N)). The content provider 602 can be implemented as a satellite operator, a network television operator, a cable operator, and the like to control distribution of program and advertising content, such as movies, television programs, commercials, music, and other audio, video, and/or image content to the client systems 604(1-N).

Content provider 602 includes various components to facilitate media data processing and content distribution, such as a subscriber manager 620, a device monitor 622, and a content server 624. The subscriber manager 620 manages subscriber data, and the device monitor 622 monitors the client systems 604(1-N) (e.g., and the subscribers), and maintains monitored client state information.

Although the various managers, servers, and monitors of content provider 602 (to include the media server 610 in one embodiment) are illustrated and described as distributed, independent components of content provider 602, any one or more of the managers, servers, and monitors can be implemented together as a multi-functional component of content provider 602. Additionally, any one or more of the managers, servers, and monitors described with reference to system 600 can implement features and embodiments of triple-tap password entry.

The television-based client systems 604(1-N) can be implemented to include a client device 626 and a display device 628 (e.g., a television). A client device 626 of a television-based client system 604 can be implemented in any number of embodiments, such as a set-top box, a digital video recorder (DVR) and playback system, a personal video recorder (PVR), an appliance device, a gaming system, and as any other type of client device that may be implemented in a television-based entertainment and information system. In an alternate embodiment, client system 604(N) is implemented with a computing device 630 as well as a client device 626. Additionally, any of the client devices 626 of a client system 604 can implement features and embodiments of triple-tap password entry as described herein.

Although embodiments of triple-tap password entry have been described in language specific to structural features and/or methods, it is to be understood that the subject of the appended claims is not necessarily limited to the specific features or methods described. Rather, the specific features and methods are disclosed as exemplary implementations of triple-tap password entry.

The invetion claimed is:

1. A method facilitating triple-tap password entry for an IP-based television system, the method comprising:
   initiating a cursor state of a password edit box on a user interface to receive each of a sequence of characters as one or more triple-tap keypad inputs, the keypad being a television-remote-control device;
   receiving a password as the sequence of characters that are each entered as one or more triple-tap keypad inputs, wherein each character of the password is obscured with at least one of an asterisk or a random character;
   displaying the one or more keypad inputs for each of the characters as the sequence of characters are received;
   after each character of the sequence of characters of the password is received and the one or more keypad inputs for each of the characters is displayed, obscuring each character of the sequence of characters of the password, the obscuring being triggered by:
      a subsequent character of the password being received; and
      an expiration of a defined time duration from which each character of the password is received but before receiving a subsequent character;
   determining the time duration from which a character of the password is received, the character of the password being obscured when the time duration meets or exceeds the defined time limit; and
   obscuring a character of the password after the character has been received such that the characters are consecutively obscured to conceal the password.

2. A method as recited in claim 1, wherein the keypad inputs for the character are displayed until the character of the password is received.

3. A method as recited in claim 1, wherein the password is received as the sequence of characters entered on an alphanumeric keypad.

4. A password entry system, the system comprising:
   a television-based device configured to receive triple-tap inputs entered on a keypad of a television remote control device;
   a user interface configured to display each character of a sequence of characters comprising a password being entered as triple-tap keypad inputs; and
   a security application configured to initiate that each character of the sequence of characters comprising the password be obscured with at least one of an asterisk or a random character such that each character of the sequence of characters of the password is consecutively obscured on the user interface after a next character is received and further configured to initiate that the character of the password be obscured on the user interface after an expiration of a defined time duration occurring before the next character is received.

5. A password entry system as recited in claim 4, further comprising a timing application configured to determine a time duration from when a character of the password is received, and initiate that the character of the password be obscured on the user interface when the time duration at least one of meets or exceeds a time limit.

6. A password entry system as recited in claim 4, wherein the user interface includes a password edit box having a selectable cursor state configurable to receive each of the characters of the sequence as the one or more triple tap inputs.

7. One or more computer readable media comprising computer executable instructions that, when executed, direct a television based device to perform a method facilitating triple-tap password entry for a television system, the method comprising:
   receive a sequence of characters that are each entered as one or more triple tap keypad inputs on a keypad of a television remote control device;
   generate a user interface display of the triple-tap keypad inputs for each of the characters as the sequence of characters is received;
   determine a time duration from which a character is received and obscure the character when the time duration meets or exceeds a defined time limit; and
   consecutively obscure each character in the sequence of characters after each character has been received to conceal the sequence of characters when the time duration meets or exceeds the defined time limit.

8. One or more computer readable media as recited in claim 7, further comprising computer executable instructions that, when executed, direct the television based device to obscure a character that is displayed on the user interface after a subsequent character in the sequence of characters is received.

9. One or more computer readable media as recited in claim 7, further comprising computer executable instructions that, when executed, direct the television based device to initiate a cursor state of a password edit box on the user interface to receive each of the sequence of characters as the one or more triple tap keypad inputs.

10. One or more computer readable media as recited in claim 7, further comprising computer executable instructions that, when executed, direct the television based device to obscure a character that is displayed on the user interface with at least one of an asterisk or a random character.

* * * * *